US 7,019,537 B2

United States Patent
Hazel et al.

(10) Patent No.: US 7,019,537 B2
(45) Date of Patent: Mar. 28, 2006

(54) NON-DESTRUCTIVE DETERMINATION OF MACHINING INDUCED SURFACE DEFECTS ON METAL PARTS

(75) Inventors: Brian Thomas Hazel, Cincinnati, OH (US); Ramgopal Darolia, West Chester, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/439,696

(22) Filed: May 16, 2003

(65) Prior Publication Data

US 2004/0227525 A1 Nov. 18, 2004

(51) Int. Cl.
*G01R 27/04* (2006.01)
*G01B 5/28* (2006.01)

(52) U.S. Cl. .................. 324/639; 324/635; 73/105

(58) Field of Classification Search ............. 324/635, 324/637, 639, 642; 73/205, 105; 250/234
See application file for complete search history.

(56) References Cited

U.S. PATENT DOCUMENTS

| | | | |
|---|---|---|---|
| 5,748,003 A | | 5/1998 | Zoughi et al. |
| 5,781,007 A | * | 7/1998 | Partika et al. ............... 324/220 |
| 5,815,124 A | | 9/1998 | Manasson et al. |
| 5,818,242 A | * | 10/1998 | Grzybowski et al. ........ 324/642 |
| 5,821,410 A | | 10/1998 | Xiang et al. |
| 5,900,816 A | | 5/1999 | Weaver |
| 5,936,237 A | | 8/1999 | Van der Weide |
| 5,960,632 A | | 10/1999 | Abuaf et al. |
| 6,173,604 B1 | | 1/2001 | Xiang et al. |

OTHER PUBLICATIONS

Ponchak et al. "Evanescent Microwave Probes using Coplanar Waveguide and Stripline for Super-resolution Imaging of Materials", 1999 IEEE MTT-S Digest, pp. 1859-1862.*

European Patent Office Search Report, Oct. 7, 2004.
XP-002297334 Evanescent Microwave Sensor Scanning for Detection of Sub-Surface Defects in Wires; Richard A. Kleismit and Marian K. Kazimierczuk; Wright State University; Department of Electrical Engineering; Dayton, OH 45435; pp. 245-250.
Effect of Specimen Surface Preparation on Room Temperature Tensile Ductility of An Fe-Containing NiAl Single Crystal Alloy R. Darolia & W.S. Walston; GE Aircraft Engines, 1 Neumann Way, Cincinnati, OH 45215; pp. 505-516.
XP-00224202 High-Frequency Near-Field Microscopy; Review of Scientific Instruments, vol. 73, No. 7, Jul. 2002; pp. 2505-2525.
Databases Inspec; The Institution of Electrical Engineers, Stevenage, GB; Lennon S.J. et al.: The Influence of Applied Stress and Surface Finish on the Pitting Susceptibility of Low Alloy Turbine Disk Steels in Wet Steam: XP002297335, vol. 40, No. 8, Aug. 1984; pp. 409-413.

* cited by examiner

*Primary Examiner*—Anjan Deb
*Assistant Examiner*—Jeff Natalini
(74) *Attorney, Agent, or Firm*—William Scott Andes; Armstrong Teasdale LLP

(57) ABSTRACT

A non-destructive method of detecting and measuring machining induced surface defects on gas turbine engine components is provided. In an exemplary embodiment, the method includes positioning an evanescent microwave microscope probe adjacent a turbine component surface, and scanning the turbine component surface by moving at least one of the evanescent microwave microscope probe and the component surface in an x-y plane while maintaining a predetermined distance between the probe and the component surface constant.

12 Claims, 3 Drawing Sheets

NON-DESTRUCTIVE DETERMINATION OF MACHINING INDUCED SURFACE DEFECTS ON METAL PARTS

BACKGROUND OF THE INVENTION

This invention relates generally to non-destructive examinations of gas turbine engine components, and more particularly to non-destructive evaluations of machining induced surface defects on gas turbine engine components.

A gas turbine engine includes a compressor for compressing air which channeled to a combustor and mixed with a fuel, wherein the mixture is ignited for generating hot combustion gases. The combustion gases are channeled to a turbine, which extracts energy from the combustion gases for powering the compressor, as well as producing useful work to propel an aircraft in flight or to power a load, such as an electrical generator. Increased efficiency in gas turbine engines is facilitated at least in part by an increase in the operating temperature of the combustor.

Machining process, for example, broaching on gas turbine engine components can produce a surface damaged metallurgical layer. This surface damaged layer can result in reduced low cycle fatigue (LCF) lives. Machining induced surface damaged layers are typically measured with optical metallography. These damaged layers are about 0.001 inch (25 micrometers ($\mu$)) or less in thickness, which approaches the accuracy limit of optical metallography. This is especially true at free surfaces which suffer from rounding during metallurgical sample preparation. It has been shown that optical metallography measurements can vary from about 50 percent to 150 percent of the depth of the measurement.

Machining of turbine components causes a distortion of the microstructural features immediately adjacent to the machined surface. This distortion can vary in degree of damage from minor cold working, exhibited by curved crystallographic grain boundaries in the direction of cold work, to a refined crystallographic grain structure that appears as a distinguishable layer at the material surface. The thickness and severity associated with the cold worked and refined structures have been seen to change with machining process parameters. It is generally accepted that an increase in the severity and thickness of these layers will affected the low cycle fatigue life of the turbine component.

BRIEF DESCRIPTION OF THE INVENTION

In one aspect, a non-destructive method of detecting and measuring machining induced surface defects on gas turbine engine components is provided. The method includes positioning an evanescent microwave microscope probe adjacent a turbine component surface, and scanning the turbine component surface by moving at least one of the evanescent microwave microscope probe and the component surface in an x-y plane while maintaining a predetermined distance between the probe and the component surface constant.

In another aspect, a non-destructive method of detecting and measuring machining induced surface defects on gas turbine engine components is provided. The method includes positioning an evanescent microwave microscope probe adjacent a turbine component surface, and scanning the turbine component by moving at least one of the evanescent microwave microscope probe and the component surface in relation to one another in an x-y plane while maintaining a distance between the probe and the turbine component surface constant. The evanescent microwave microscope probe includes a metal probe tip having an end sharpened to a point and further includes a conductive surface of at least one of silver, gold, platinum, palladium and alloys thereof.

In another aspect, a non-destructive method of detecting and measuring machining induced surface defects on gas turbine engine components is provided. The method includes positioning an evanescent microwave microscope probe adjacent a turbine component surface, scanning the turbine component by moving at least one of the evanescent microwave microscope probe and the component surface in relation to one another in an x-y plane while maintaining a distance between the probe and the turbine component surface constant, and detecting reflected microwave radiation with a detector coupled to the evanescent microwave microscope probe. The evanescent microwave microscope probe includes a metal probe tip having an end sharpened to a point and further includes a conductive surface of at least one of silver, gold, platinum, palladium and alloys thereof.

DETAILED DESCRIPTION OF THE INVENTION

Non-destructive examination of machining induced surface defects on gas turbine engine components using evanescent microwave microscopy is described in detail below. Evanescent microwave microscopy is used for imaging scans of the surface of turbine components with resolutions of $\lambda/1000$ or better, where $\lambda$ is the wavelength of microwave energy in free space. Evanescent microwaves are capable of high resolution imaging using "near fields". This permits non-destructive imaging of materials that are sensitive to near field microstructure. The evanescent microwave probe measures frequency as it traverses a surface. The frequency is sensitive to probe distance, conductivity, dielectric, and changes of the near surface material. The cold worked surface of a machined metal exhibits a change in conductivity due to a change in grain size or localized melting at the near surface.

In evanescent microwave field imaging, the fields are intentionally confined or restricted to regions that are significantly smaller than their wavelength. The fields in these regions are restricted and are unable to travel freely, so they evanesce or attenuate exponentially. These decaying fields are employed to scan over material objects much smaller than the wavelength of the traveling field exciting resonance in the microwave probe. This methodology enables the classical limit, i.e., Abbe barrier, to be exceeded. This limit on the spatial resolution or minimum resolvable size is ½ of the wave length $\lambda$ of the electromagnetic excitation fields. To recover a signal, all the spatial frequency components contained within that signal are recovered. The basic principal is to closely scan in two or three dimensions a point like field source of a material object so that the evanescent field is powerful enough to interact with the properties of the material, such as a thermal barrier coating. This results in an image with resolved features significantly smaller than the Abbe limit and governed by the characteristic size and conductivity of the probe tip.

Figure 1:
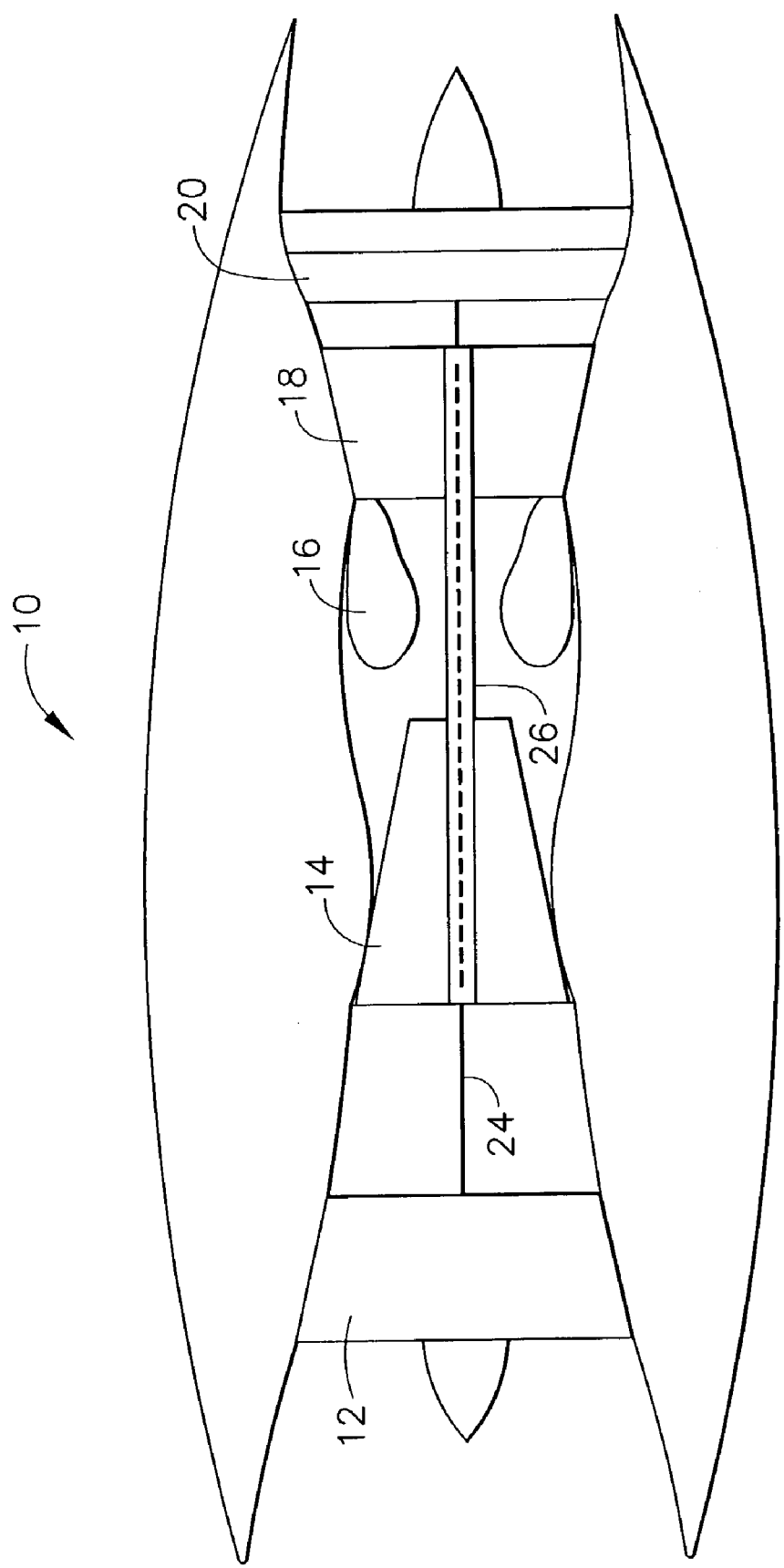
FIG. 1 is a schematic illustration of a gas turbine engine.

Referring to the drawings, FIG. 1 is a schematic illustration of an exemplary gas turbine engine 10 including a low pressure compressor 12, a high pressure compressor 14, and a combustor assembly 16. Engine 10 also includes a high pressure turbine 18, and a low pressure turbine 20. Compressor 12 and turbine 20 are coupled by a first shaft 24, and compressor 14 and turbine 18 are coupled by a second shaft 26.

In operation, air flows through low pressure compressor 12 from an inlet of engine 10 and compressed air is supplied from low pressure compressor 12 to high pressure compressor 14. Compressed air is then delivered to combustor assembly 16 where it is mixed with fuel and ignited. The combustion gases are channeled from combustor 16 to drive turbines 18 and 20.

Figure 2:
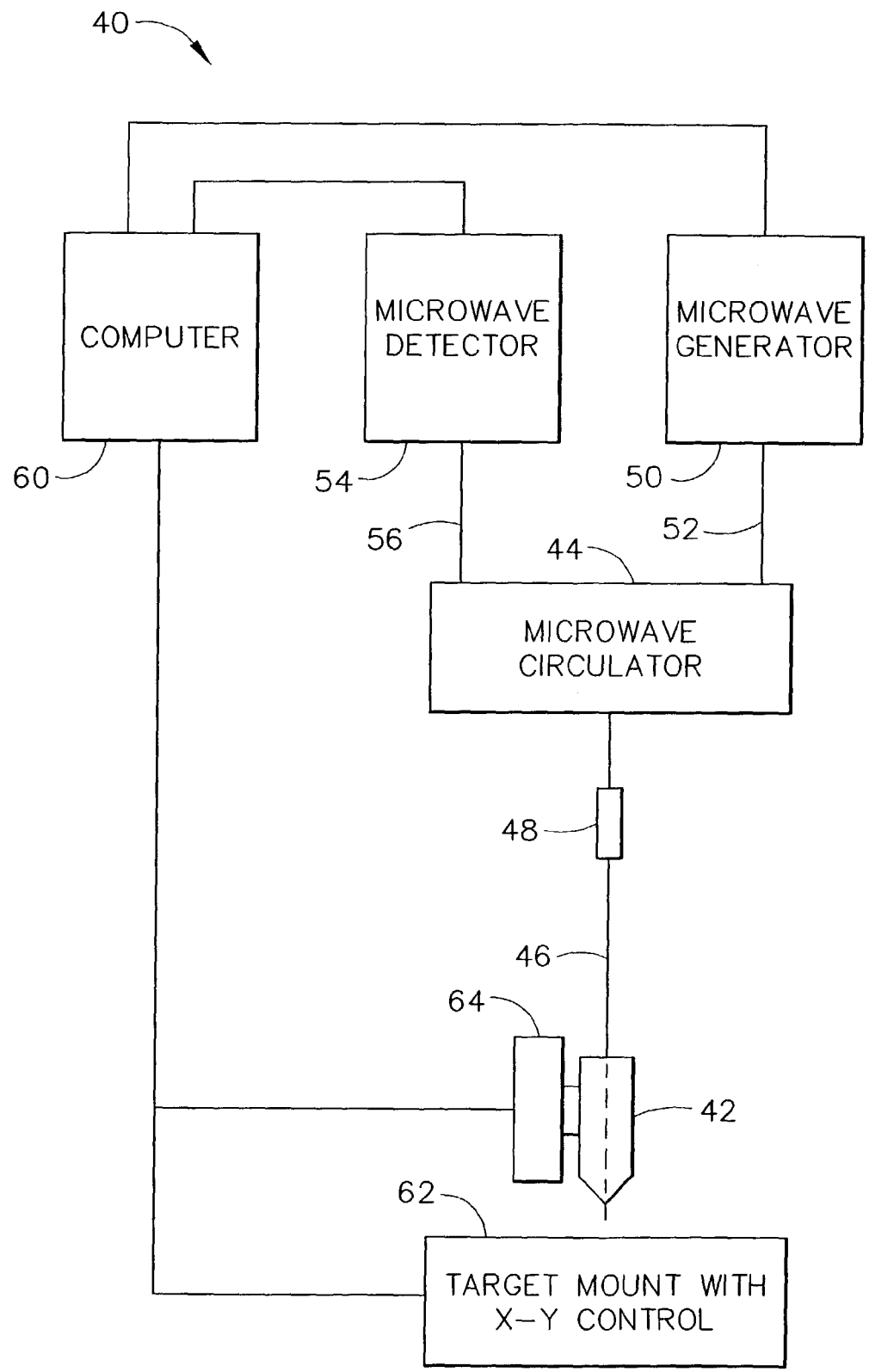
FIG. 2 is a schematic illustration of the various components of an evanescent microwave microscope with probe.

FIG. 2 is a schematic illustration of an exemplary embodiment of the various components of an evanescent microwave microscope system 40 that includes an evanescent microwave probe 42. Probe 42 is capacitively coupled to a microwave circulator 44 by a coaxial cable 46 and a coupling capacitor 48. Coaxial cable 46 can also be referred to as a transmission line 46. Capacitor 48 is variable so the range of resonance can be tuned. A microwave generator 50 is connected to microwave circulator 44 by a coaxial cable 52. Any suitable microwave generator can be used, for example, sweep generator HP8350B commercially available from Hewlett Packard. A microwave detector 54 is also connected to microwave circulator 44 by a coaxial cable 56. Microwave detector 54, for example, a square law crystal microwave detector, permits a frequency modulated signal to be extracted from the microwave excitation signal. The frequency modulated signal is proportional to the magnitude of the reflected microwave radiation captured by probe 42. A computer 60 is operatively connected to microwave generator 50 to control and monitor generator 50. Computer 60 is also operatively coupled to detector 54 to collect scan data and perform data acquisition functions.

A target mount 62 with X-Y axis control supports the component that is to be examined. Probe 42 is mounted on a Z-axis linear actuator 64 to provide controlled spacing of probe 42 and the part to be examined. Computer 60 is also operatively connected to target mount 62 and linear actuator 64 to precisely control the X-Y axis movement of target mount 62 and the Z-axis movement of actuator 64.

Figure 3:
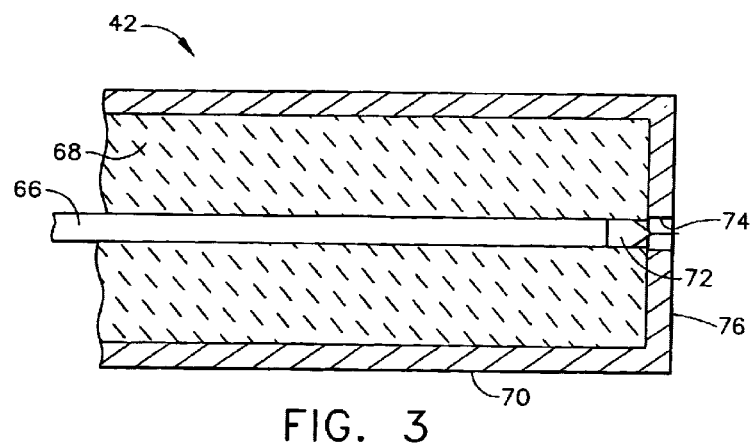
FIG. 3 is a schematic illustration of the evanescent microwave microscope probe shown in FIG. 2.

FIG. 3 is a schematic illustration of an exemplary embodiment of evanescent microwave microscope probe 42. Probe 42 includes a center conductor 66 surrounded by an insulator 68 and an outer shield 70. An end portion (or tip) 72 of center conductor 66 is sharpened to a point and is plated with layer of at least one of silver, gold, platinum, palladium and alloys thereof. In the exemplary embodiment, end portion 72 is plated with silver. In alternate embodiments, end portion 72 is fabricated from silver gold, platinum, palladium or alloys thereof. The higher conductivity of silver, gold, platinum, and palladium increases the quality factor Q of probe 42. High Q values promote high sensitivity of probe 42. Tip 72 of center conductor 66 extends through an aperture 74 in an end wall 76 of outer shield 70.

Microwave probe 42 is a resonator type probe that is based on an open-transmission line. Such a resonator probe behaves as a parallel resonant circuit when the length of transmission line 46 is a multiple of $\lambda/2$, where $\lambda$ is the wavelength of microwave energy in free space. The overall length of transmission line 46 is selected to give multiple resonances in the bandwidth of microwave generator 50.

When a sample object is placed adjacent probe tip 72, the reflection coefficient of probe 42 changes. Both the resonance frequency $f_0$ and the quality factor Q of probe 42 are affected by the presence of the sample. The amount of change in the resonance (df and dQ) depends primarily on the microwave properties of the sample as well as the distance d between tip 72 and the sample, and the effective area $A_{eff}$ of probe tip 72. Keeping $A_{eff}$ and d constant, probe 42 is scanned over the sample and variations in the microwave properties of the sample are mapped. Changes in the substrate surface (ground plane), defect layer properties, dielectric constant, and electrical conductivity affect the reflection coefficient. These properties are directly related to the quality of the surface of the metal component and the thickness and severity of any machining induced damaged surface layers. Particularly, machining of turbine components causes a distortion of the microstructural features immediately adjacent to the machined surface. This distortion varies in degree of damage from minor cold working, exhibited by curved crystallographic grain boundaries in the direction of cold work, to a refined crystallographic grain structure that appears as a distinguishable layer at the material surface. A difference exists in the conductivity/dielectric properties of the unaffected material and the refined crystallographic grain structure generated by machining at the material surface. Therefore, changes in the machining induced surface layer affect the measurements of the evanescent microwave microscopy.

Figure 4:
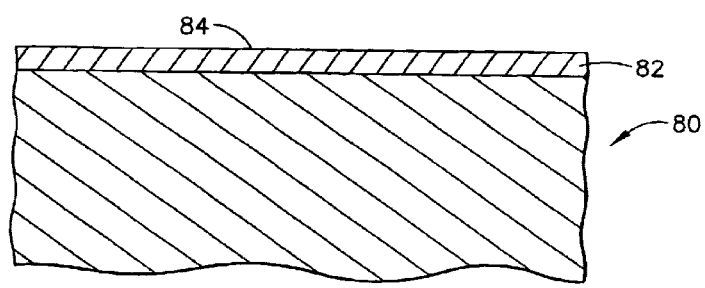
FIG. 4 is a schematic sectional illustration of a gas turbine engine component having a surface damaged layer.

FIG. 4 is a schematic sectional view of a gas turbine engine component 80 with a machining induced surface defect layer 82. Defect layer 82 has a conductivity, dependent on the properties of defect layer 82 such as a thickness T that is measurable by evanescent microwave microscope system 40 with evanescent microwave probe 42. Thickness T of defect layer 82 can vary between about 0.0001 inch to about 0.002 inch (about 2.5µ to about 50.0µ) and is very difficult to accurately measure using conventional optical metallography.

To scan component 80 to detect a possible machine induced surface defect layer 82, component 80 is mounted on target mount 62. The distance between component 82 and probe tip 72 is set to a predetermined value by activating linear actuator 64. Component 80 is then scanned by moving component 80 in relation to probe 42 by using the X-Y axis control function of target mount 62. During the scanning of component 80, microwave generator 50 generates a microwave signal that is directed to probe 42 through microwave circulator 44. Detector 54 extracts frequency modulated signal data from the microwave excitation signal that is proportional to the magnitude of the reflected microwave radiation captured by probe 42. Computer 60 collects and process the detected scan data during the scanning process.

In an alternative embodiment, evanescent microwave probe 42 is a resonant cavity having an aperture, for example, a rectangular resonant cavity having an aperture of about 0.1λ. In another alternate embodiment, the resonant cavity is a cylindrical resonant cavity having a slot shaped aperture. A cylindrical resonant cavity can be sized to conform to the shape of turbine component 80 to increase measurement sensitivity and spatial resolution.

The above described evanescent microwave probe 42 permits detection and measurement of a machine induced surface defect layer 82 in gas turbine engine components. Field imaging scans of surface 84 of component 80 detect surface defect layer 82 and provide the scan data for determining the thickness T of defect layer 82.

An exemplary embodiment of an evanescent microwave probe is described above in detail. The apparatuses illustrated are not limited to the specific embodiments described herein, but rather, components of each may be utilized independently and separately from other components described herein.

While the invention has been described in terms of various specific embodiments, those skilled in the art will recognize that the invention can be practiced with modification within the spirit and scope of the claims.

What is claimed is:

1. A non-destructive method of detecting and measuring machining induced surface and microstructural defects on gas turbine engine components, said method comprising:

positioning an evanescent microwave microscope probe adjacent a surface of a gas turbine engine component; and detecting and measuring machine-induced surface and microstructural defects by scanning the turbine component surface by moving at least one of the evanescent microwave microscope probe and the component surface in an x-y plane while maintaining a predetermined distance between the probe and the component surface constant; and calculating a thickness of a surface damaged layer of the component surface at each scan point.

2. A method in accordance with claim 1 wherein the evanescent microwave microscope probe comprises a metal probe tip having an end sharpened to a point and further comprises a conductive surface of at least one of silver, gold, platinum, palladium and alloys thereof, said positioning an evanescent microwave microscope probe adjacent a turbine component surface comprises positioning the sharpened probe tip a predetermined distance from the turbine component surface.

3. A method in accordance with claim 2 wherein a detector is coupled to the evanescent microwave microscope probe, said method further comprises detecting reflected microwave radiation with the detector coupled to the evanescent microwave microscope probe.

4. A method in accordance with claim 3 wherein the detector is coupled to a computer, said method further comprises sending detected reflected microwave radiation data to the computer.

5. A method in accordance with claim 4 further comprises generating graphical plots from detected reflected microwave radiation data showing the morphology of the component surface.

6. A non-destructive method of detecting and measuring machining induced surface and microstructural defects on gas turbine engine components, said method comprising:

positioning an evanescent microwave microscope probe adjacent a surface of a gas turbine engine component; and detecting and measuring machine-induced surface and microstructural defects by scanning the turbine component by moving at least one of the evanescent microwave microscope probe and the component surface in relation to one another in an x-y plane while maintaining a distance between the probe and the turbine component surface constant;

wherein the evanescent microwave microscope probe comprises a metal probe tip having an end sharpened to a point and further comprises a conductive surface of at least one of silver, gold, platinum, palladium and alloys thereof; and calculating a thickness of a surface damaged layer of the component surface at each scan point.

7. A method in accordance with claim 6 wherein the evanescent microwave microscope probe is coupled to a detector, said method further comprises detecting reflected microwave radiation with the detector coupled to the evanescent microwave microscope probe.

8. A method in accordance with claim 7 wherein the detector is coupled to a computer, said method further comprises sending detected reflected microwave radiation data to the computer.

9. A method in accordance with claim 8 further comprising generating graphical plots from detected reflected microwave radiation data showing the morphology of the turbine component surface.

10. A non-destructive method of detecting and measuring machining induced surface and microstructural defects on gas turbine engine components, said method comprising:

positioning an evanescent microwave microscope probe adjacent a surface of a gas turbine engine component;

scanning the turbine component by moving at least one of the evanescent microwave microscope probe and the component surface in relation to one another in an x-y plane while maintaining a distance between the probe and the turbine component surface constant;

detecting reflected microwave radiation with a detector coupled to the evanescent microwave microscope probe;

wherein the evanescent microwave microscope probe comprises a metal probe tip having an end sharpened to a point and further comprises a conductive surface of at least one of silver, gold, platinum, palladium and alloys thereof; and detecting and measuring machine-induced surface and microstructural defects using the detector; and calculating a thickness of a surface damaged layer of the component surface at each scan point.

11. A method in accordance with claim 10 wherein the evanescent microwave microscope system comprises a computer coupled to the detector, said method further comprises sending detected reflected microwave radiation data to the computer.

12. A method in accordance with claim 11 further comprising generating graphical plots from detected reflected microwave radiation data showing the morphology of the turbine component surface.

* * * * *